March 22, 1966     I. BERESINSKY     3,241,673
SAFETY FILLING-GRILL
Filed Feb. 19, 1963

INVENTOR.
ISAAC BERESINSKY
BY
ATTORNEYS

United States Patent Office 3,241,673
Patented Mar. 22, 1966

3,241,673
SAFETY FILLING-GRILL
Isaac Beresinsky, Asherat, Israel, assignor to Dagon Batey-Manguroth le-Israel Ltd., P.O.B., Haifa, Israel, a corporation of Israel
Filed Feb. 19, 1963, Ser. No. 259,661
2 Claims. (Cl. 209—395)

The present invention is directed to safety devices, more particularly to means for protecting openings in floors or the like through which materials are adapted to flow, against persons accidentally falling or stepping into such openings.

In various installations, such as in grain silos, there are openings in floors through which the material, such as grain, flows into bins or for transportation to other locations as by chain conveyors or the like. To protect these openings to prevent persons from accidentally stepping into them, grills were set and fixed therein. They adequately prevented such accidents and still allowed the grain to pass through. In a silo there are usually a number of such openings so protected.

Such materials have mixed therewith extraneous matter, for instance, straw, string, paper, stones, pieces of wood, wire, machine parts and the like. In some instances the operator would remove the grill, in order to prevent this clogging. However, this practice was dangerous and in some instances resulted in a tragedy. This debris was largely caught in the grill and resulted in clogging thereof. This necessitated stopping the flow and cleaning the grill, which interfered with the sequence of operations in the plant.

To overcome this it was proposed to increase the distance between the elements of the grill, such as by increasing the size of the holes in the grill. However, it was found that if the interstices were sufficiently large to allow all the debris to fall through, they were so large that the danger of accidental injury to the operator was great. If the interstices were small enough to avoid injuries, the clogging of the grill remained a serious problem in the plant operation.

The present invention is intended and adapted to overcome the difficulties and disadvantages inherent in the prior art safety grills, it being among the objects thereof to provide a grill structure for the purpose described above, which shall provide safety for the operator and for other persons who happen to be in the vicinity of the flowing materials.

It is also among the objects of the present invention to provide a structure of grill which allows of the free, unrestricted flow of material while providing such safety and without the danger of clogging of the grill.

It is further among the objects of the invention to provide such an improved grill structure which is simple, highly effective, strong and no more costly than prior grills.

In practicing the present invention there is provided a grill of any desired construction, but preferably having a frame, the size of which enables it to conform with and to fit the shape and size of the opening. A series of substantially parallel bars or ribs are fitted into the frame and preferably attached to one side of the frame with the other ends of the bars being free. The essence of the invention is the manner in which the grill so formed is mounted in the opening. It is attached along said one side to the adjacent wall of the opening at an angle to the floor so that the grill slopes down below the floor. Preferably the plane of the grill is at an angle of about 15° to the horizontal or floor which has been found to be most effective for use in grain elevators. For other purposes this angle may vary somewhat, but in practically all cases the angle should be not more than about 45°.

For best results the bars should be relatively deep compared to the thickness thereof. This gives sufficient rigidity to withstand the weight of the material and also the weight of any person or persons who might accidentally step on the grill. It is also important that the direction of flow of the material be at an angle downwardly from the area where the grill is attached to the wall of the opening so that the angle between the direction of flow of material onto the grill and the grill itself is less than 90°.

The invention is more fully described in connection with the accompanying drawing constituting a part hereof and in which like reference characters indicate like parts and in which.

Figure 1:
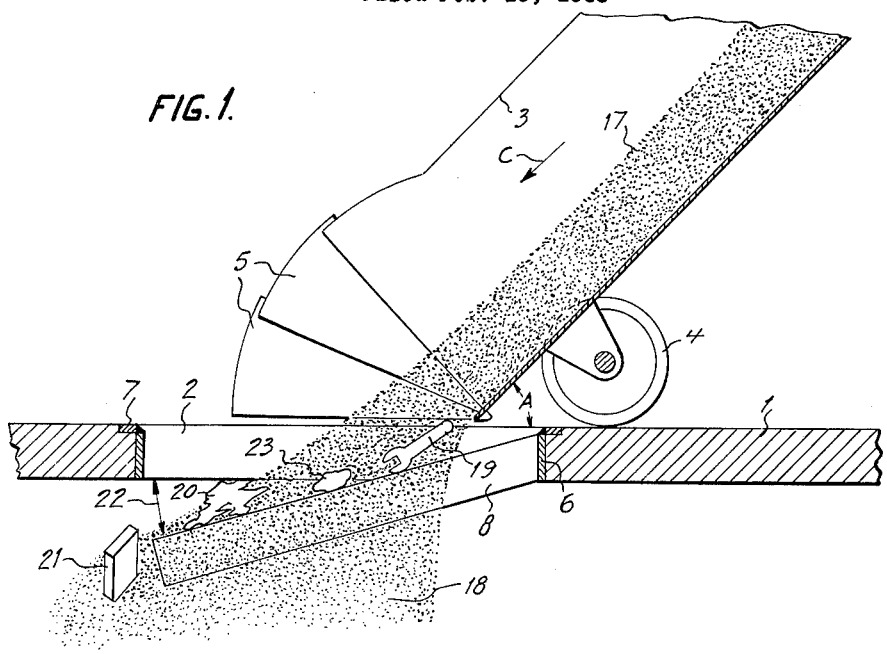
FIG. 1 is a side elevational view of a safety filling-grill made in accordance with the present invention, some parts being shown in section for clearness, and the flow of material therethrough being indicated to illustrate the effect thereof.
Figure 2:
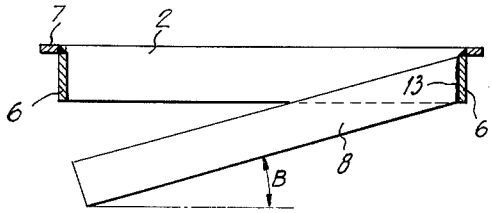
FIG. 2 is a view similar to FIG. 1 showing the attachment of the grill to the wall of the opening.
Figure 3:
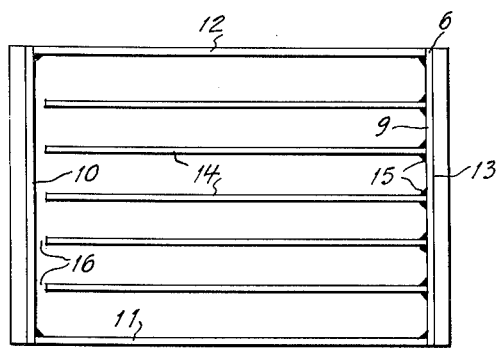
FIG. 3 is a top plan view of the grill.

Base 1 is a floor or other horizontal member having an opening 2 therein, here shown as being rectangular, which is to be protected by a grill. A conveyor of any suitable type such as 3 mounted on wheels 4 and having louvers 5, is placed on floor 1 and slopes as shown at an angle A to the floor or horizontal. The opening is defined by walls 6 and supported by plates 7 which are welded to walls 6.

Grill 8 consists of one side 9 and an opposite parallel side 10 joined together by members 11 and 12 to form a rectangle, the side 9 of which is welded at 13 to wall 6. The frame 9–12 has its plane at an angle B to the base 1 so that a substantial space is left at the side 10. A series of parallel ribs or bars 14 are mounted within the frame and equally spaced. They are welded to side 9 at 15 but the opposite ends of said ribs are free as shown at 16. In a specific example, the depth of ribs 14 is about ten times the thickness thereof and the spaces between adjacent ribs is about equal to the depth thereof.

In operation, conveyor 3 is placed with its lower end at opening 2 and material 17 is released at its upper end to flow down through opening 2 and frame 9–12 to be discharged in the direction of arrow C. It passes at 18 into a receptacle or any suitable apparatus such as a chain conveyor, not shown. Debris, such as wrench 19, paper 20 and wood 21, being of relatively large size pass over the grill through space 22, while small objects like 23 will fall down between ribs 14.

With the present grill there is no danger of persons falling through the opening or coming into contact with dangerous or moving machinery. The material being treated will move freely without danger of clogging the grill provided the angle of the flowing material is like that described above. The angle of the grill may be that which experience has shown to be the best for the type of material being transported, and the character of the debris carried by it. The shape of opening 2 may be other than that shown and the shape of the grill may be similar to the opening. But it is not essential that the grill frame be of the same shape as the opening; the area of the grill should be sufficient to give the protection and the freedom of flow contemplated herein.

What is claimed is:

1. A safety filling grill structure comprising a substantially horizontal base, a substantially rectangular opening in said base, a frame having opposed walls in said opening, a grill having an area approximately that of said opening, said grill consisting of a plurality of substantially parallel spaced ribs of substantial depth, the plane of said ribs being substantially vertical, one end of said ribs being attached to one wall of said frame on the inner face of said frame, the other end of said ribs being free, said ribs sloping downward, said free end of said ribs being unconnected to each other and to said frame, a space between said free end and the lower edge of the wall opposite to said one wall, said ribs being at an angle of about 15° to 45° to the horizontal, whereby a material conveyor can be positioned on said base adjacent to said opening to slope in the same direction as said ribs to direct the flow of said material onto said ribs in the direction of said space.

2. A safety filling-grill according to claim 1 characterized in that the depth of said ribs is substantially greater than the thickness thereof and substantially equal to the depth of said frame.

References Cited by the Examiner

UNITED STATES PATENTS

| | | | |
|---|---|---|---|
| 249,604 | 11/1881 | Fisher | 209—375 |
| 1,030,653 | 6/1912 | Dyer | 209—393 X |
| 1,231,694 | 7/1917 | Becker | 209—377 X |
| 1,317,479 | 9/1919 | Buck | 209—99 X |
| 1,654,886 | 1/1928 | Keeble et al. | 94—31.1 |
| 2,198,285 | 3/1940 | Krenzer | 209—99 X |
| 2,201,534 | 5/1940 | Hallenbeck | 94—44 |

HARRY B. THORNTON, *Primary Examiner.*

JACOB L. NACKENOFF, *Examiner.*

R. HALPER, J. D. LISTER, *Assistant Examiners.*